(12) United States Patent
Kim

(10) Patent No.: US 10,328,773 B2
(45) Date of Patent: Jun. 25, 2019

(54) AIR VENT FOR VEHICLE

(71) Applicant: NIFCO KOREA INC., Asan-si, Chungcheongnam-do (KR)

(72) Inventor: Sung Hwa Kim, Asan-si (KR)

(73) Assignee: Nifco Korea Inc., Chungcheongnam-do (KR)

( * ) Notice: Subject to any disclaimer, the term of this patent is extended or adjusted under 35 U.S.C. 154(b) by 234 days.

(21) Appl. No.: 15/534,670

(22) PCT Filed: Dec. 11, 2015

(86) PCT No.: PCT/KR2015/013596
§ 371 (c)(1),
(2) Date: Jun. 9, 2017

(87) PCT Pub. No.: WO2016/093660
PCT Pub. Date: Jun. 16, 2016

(65) Prior Publication Data
US 2017/0341488 A1 Nov. 30, 2017

(30) Foreign Application Priority Data

Dec. 11, 2014 (KR) .................. 10-2014-0178578

(51) Int. Cl.
*B60H 1/34* (2006.01)
*B60H 1/00* (2006.01)

(52) U.S. Cl.
CPC ......... *B60H 1/3414* (2013.01); *B60H 1/0065* (2013.01); *B60H 1/00564* (2013.01);
(Continued)

(58) Field of Classification Search
CPC .............. B60H 1/3414; B60H 1/00564; B60H 1/0065; B60H 1/3421; B60H 2001/3471; B60H 2001/3478
(Continued)

(56) References Cited

U.S. PATENT DOCUMENTS 8,616,943 B2 * 12/2013 Arndt ................. B60H 1/34
454/154
2003/0157880 A1 * 8/2003 Nishida ............... B60H 1/3414
454/155
(Continued)

FOREIGN PATENT DOCUMENTS

DE 103 38 762 A1 3/2005
JP 07232548 A 9/1995
(Continued)

OTHER PUBLICATIONS

Extended European Search Report dated Aug. 17, 2018 relating to European Patent Application No. 15866739.4, 5 pages.
(Continued)

*Primary Examiner* — Helena Kosanovic
(74) *Attorney, Agent, or Firm* — Stinson LLP

(57) ABSTRACT

The present invention relates to an air vent for a vehicle, provided with a damper for opening or closing the air path of a duct housing with improved operation quality and convenience. The air vent for a vehicle comprises: a duct housing (20) having an air path inside, a vane member for adjusting air discharge direction, a damper (21) for opening or closing the air path and a cover fixing boss (22) formed in an outside surface; a dial knob (30) rotationally coupled to the duct housing (20) and having a knob coupling hole (31); a damper rotation member (40) coupled to a damper (21) rotation shaft and having a pinion gear (41); a knob connector (50) having protruded coupling members (51), of which one is fitted into the knob coupling hole (31); a damper connector (60) link-connected to the knob connector (50), provided with a rack gear (61) to be engaged with the pinion gear (41), and having a guide hole (62) placed by the cover fixing boss (22) of the duct housing (20); and a guide cover (70) having an insertion part (71) fitted with the cover
(Continued)

fixing boss (22), and a finishing part (72) coupled to the cover fixing boss (22) by a coupling member (73).

3 Claims, 6 Drawing Sheets

(52) U.S. Cl.
CPC ... *B60H 1/3421* (2013.01); *B60H 2001/3471* (2013.01); *B60H 2001/3478* (2013.01)

(58) Field of Classification Search
USPC ........................................................ 454/155
See application file for complete search history.

(56) References Cited

U.S. PATENT DOCUMENTS

| | | | | |
|---|---|---|---|---|
| 2004/0203334 | A1* | 10/2004 | Shibata | B60H 1/3428 454/155 |
| 2005/0239391 | A1* | 10/2005 | Shibata | B60H 1/3421 454/155 |
| 2007/0060040 | A1* | 3/2007 | Ogura | B60H 1/3421 454/319 |
| 2011/0319005 | A1* | 12/2011 | Sawada | B60H 1/00678 454/155 |
| 2017/0305238 | A1* | 10/2017 | Brinas | B60H 1/00564 |
| 2019/0001790 | A1* | 1/2019 | Demerath | B60H 1/3421 |

FOREIGN PATENT DOCUMENTS

| | | |
|---|---|---|
| JP | 2001219736 A | 8/2001 |
| JP | 2013180708 A | 9/2013 |
| JP | 3187856 U | 12/2013 |
| KR | 1020060016344 A | 2/2006 |
| KR | 100613710 B1 | 8/2006 |
| WO | 2011/149247 A2 | 12/2011 |

OTHER PUBLICATIONS

International Search Report of related application PCT/KR2015/013596 dated Feb. 19, 2016, 2 pages.

* cited by examiner

[Fig. 1]
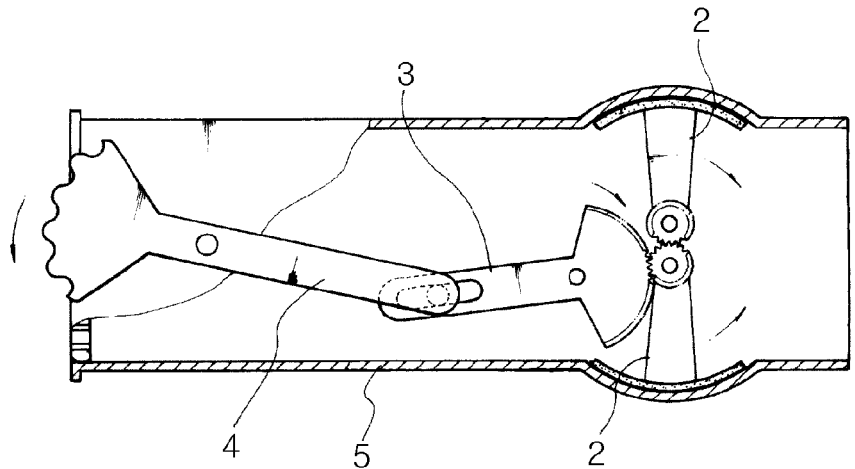
[Fig. 2]
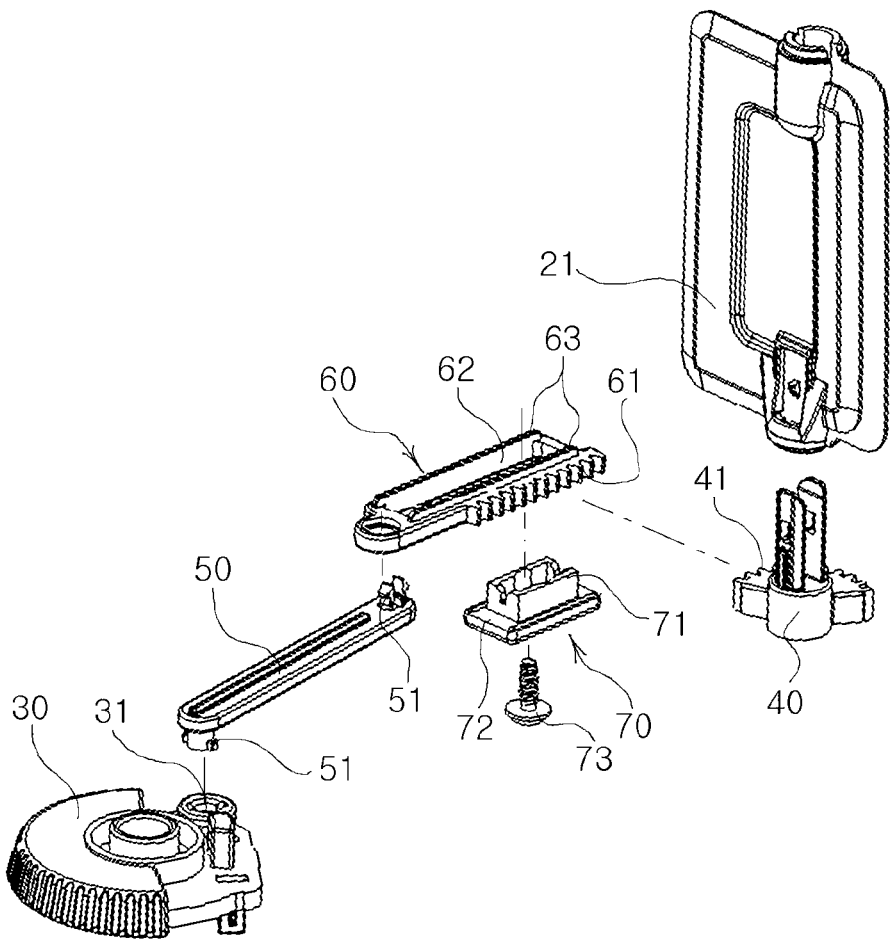

[Fig. 3]
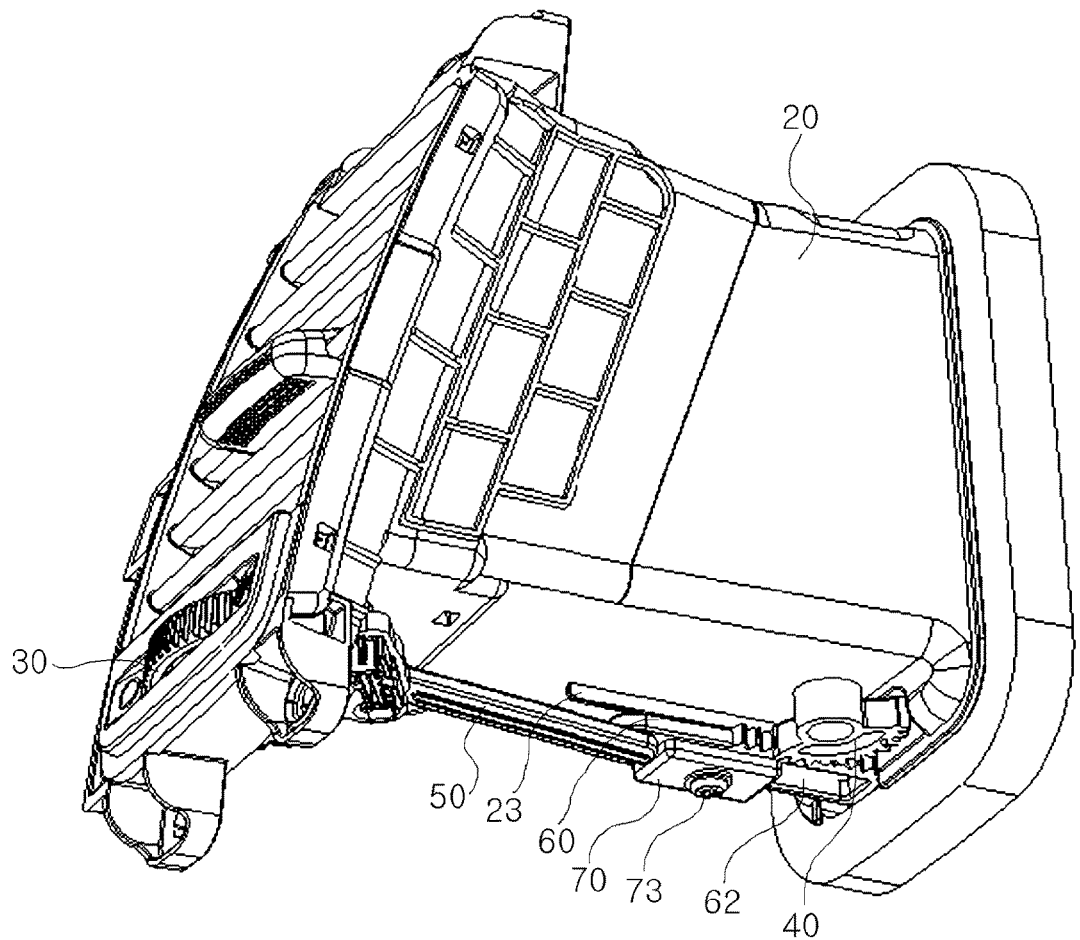
[Fig. 4]
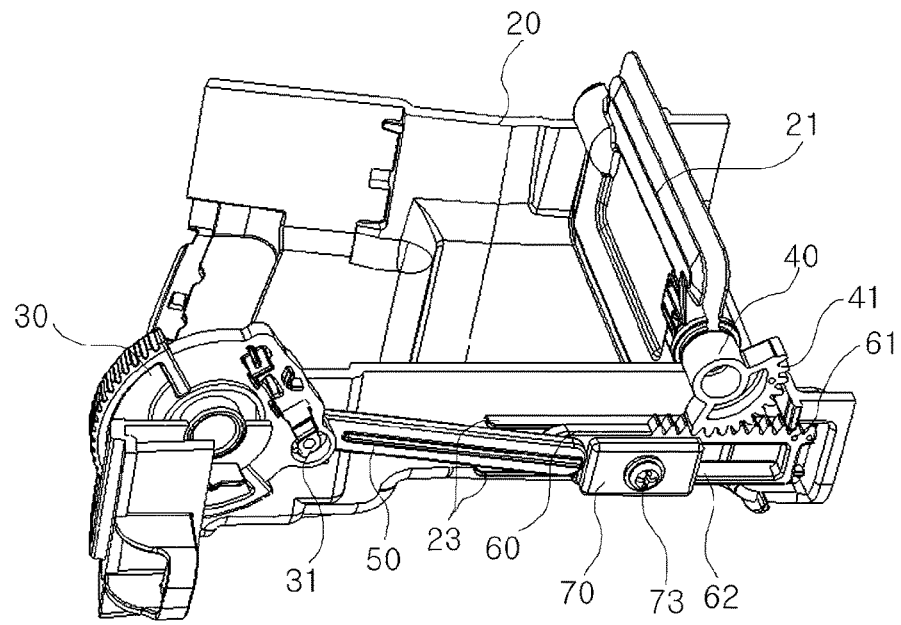

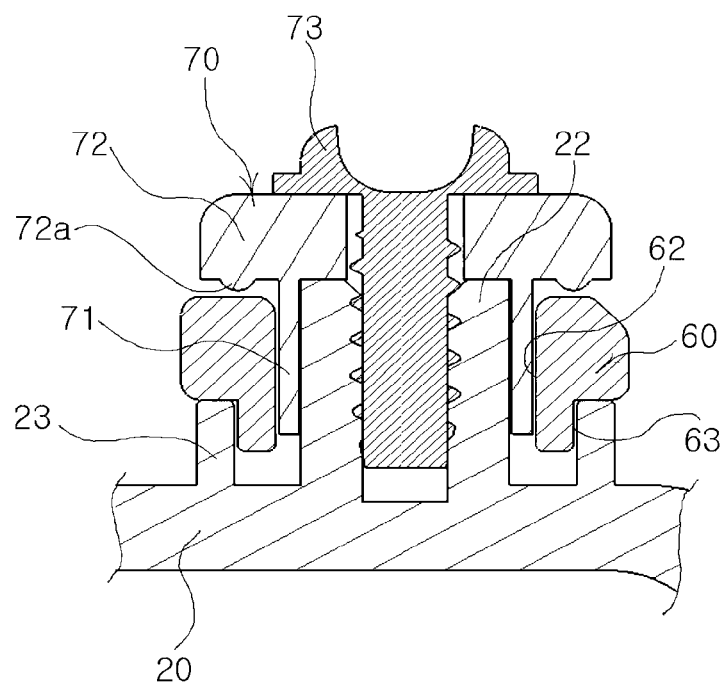
[Fig. 5]

[Fig. 6]
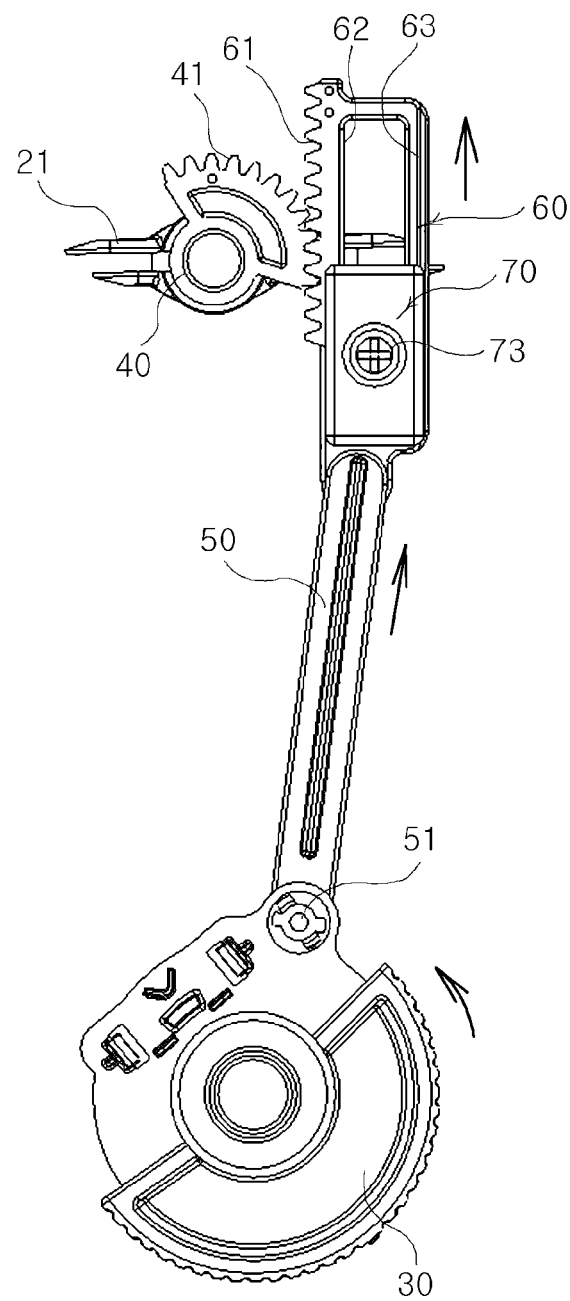

[Fig. 7]
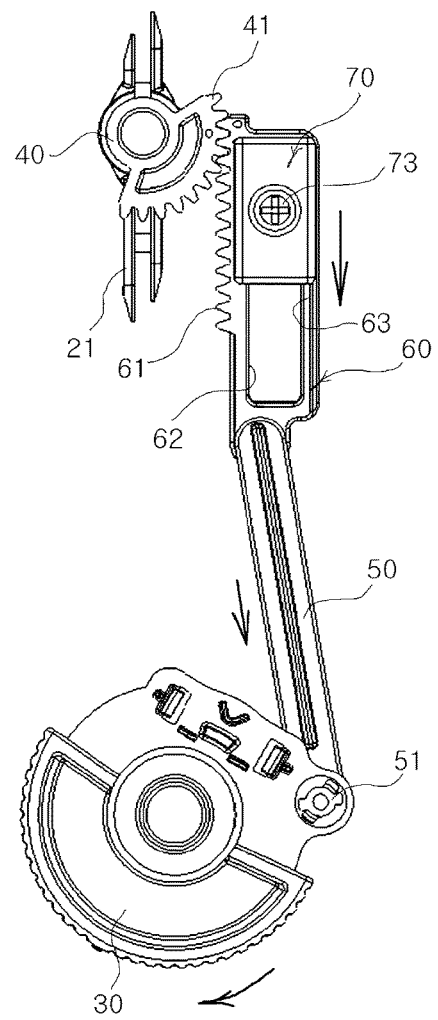
[Fig. 8a]
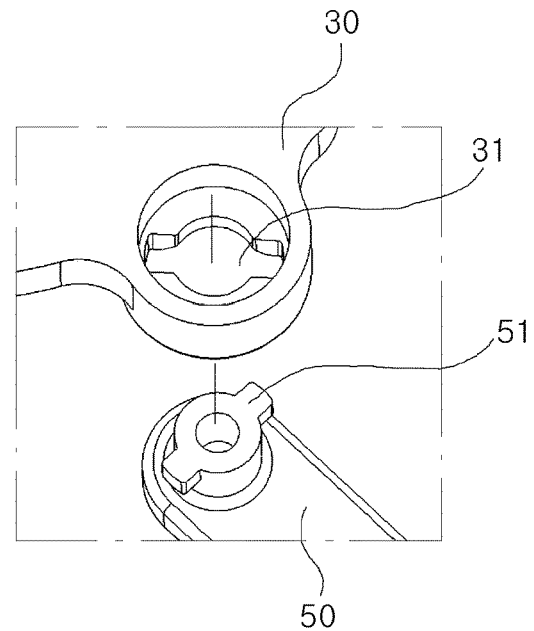

[Fig. 8b]
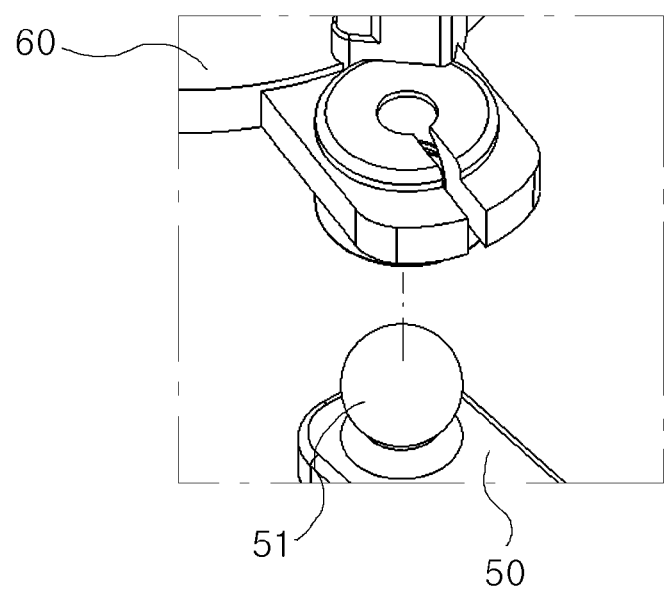

AIR VENT FOR VEHICLE

CROSS-REFERENCE TO RELATED APPLICATIONS

This application is a national stage application of PCT/KR2015/013596, filed Dec. 11, 2015, which claims priority to Korean application 10-2014-0178578, filed Dec. 11, 2014, the entire contents of which are incorporated herein by reference for all purposes.

TECHNICAL FIELD

The present invention relates to an air vent for a vehicle and, more specifically, to an air vent for a vehicle, wherein a damper for opening or closing the air path of a duct housing is operated by the rotation of a dial knob in association with a gear part so as to improve operation quality and convenience.

BACKGROUND ART

In general, a vehicle is installed with air conditioning equipment, in which an air duct having an air movement path is provided such that an air conditioner and a heater are mounted so as to circulate and purify the room air and outside air or maintain the temperature of a vehicle room.

Air vents connected to the discharge parts of the air duct are provided to panels in a vehicle room so as to be used for discharging the air from the air conditioner or the heater towards a driver and passengers in desired directions such that the driver or the passengers can enjoy travelling of cool or warm comfort.

The air vent as described above typically includes an air vent housing provided with an air path, a damper for opening or closing the air path of the air vent housing and a knob for operating the damper.

There have been suggested constituent elements for rotating the damper by operating the knob, as shown in FIG. 1, wherein intermediate stems 2, each having a gear formed at one side so as to be engaged with the path of a duct 5, rotate in the duct 5 by the operations of a main lever 3 and an auxiliary lever 4 so as to carry out opening and closing the path.

However, the prior art damper device has a problem in the operation thereof since deformation and bending are apt to be generated more as long as the lengths of the main lever and the auxiliary lever. Therefore, it is difficult to accurately transmit a stroke, thereby resulting in the failure of the rotation operation of the damper and the decrease of airtightness performance.

PRIOR ART DOCUMENT

[Patent Document 1] Korean Utility Model Reg. Publication No. 20-0244242: Air vent damper for vehicle air conditioning device (Reg. on 06 Aug. 2001)

DISCLOSURE OF INVENTION

Technical Problem

Accordingly, the present invention has been derived to solve the above-mentioned problems and disadvantages occurring in the prior arts, and it is an objective of the present invention to provide an air vent for a vehicle, which can accurately transmit a stroke according to the rotation of a dial knob and simplify the rotation of a damper.

It is another objective of the present invention to provide an air vent for a vehicle, wherein a damper connector engaged with a damper can linearly move by the rotation of a dial knob and the damper connector is guided to move along duct rails so as to improve operation feeling and quality.

Solution to Problem

To accomplish the above objectives, according to one aspect of the present invention, there is provided an air vent for a vehicle, comprising: a duct housing having an air path provided inside, a vane member assembled in the front portion of the air path so as to adjust air discharge direction, a damper rotationally coupled to the rear portion of the air path so as to open or close the air path and a cover fixing boss formed in an outside surface; a dial knob rotationally coupled to a side surface of the duct housing and having a knob coupling hole formed in a rear portion; a damper rotation member coupled to a damper rotation shaft on the side surface of the duct housing and having a pinion gear formed on the outer circumferential surface thereof; a knob connector having coupling members protrudingly formed at both end portions thereof such that the coupling member at one end portion is fitted into the knob coupling hole; a damper connector, of which one side end is link-connected to the other end of the knob connector and the other side end is provided with a rack gear at the upper portion thereof so as to be engaged with the pinion gear, and having a guide hole formed inside in the back-and-forth longitudinal direction so as to be placed by the cover fixing boss of the duct housing; and a guide cover having an insertion part, into which the cover fixing boss is fitted and of which outer diameter surface comes into contact with the guide hole of the damper connector, and a finishing part provided to be stepped on the outside thereof so as to be coupled to the cover fixing boss by a coupling member.

In addition, duct rails are formed to be protruded on the side surface of the duct housing so as to be placed by the inside surface of the damper connector and escape prevention rails are formed on the inside surface of the damper connector so as to be positioned between the dust rails, such that the damper connector linearly moves along the duct rails in the back-and-forth direction.

Further, a convex protrusion is further formed on the finishing part of the guide cover, which comes into contact with the outer surface of the damper connector, such that the damper connector and the convex protrusion come into contact with each other.

Advantageous Effects of Invention

According to the present invention structured as above, the damper is rotated by a stroke accurately transmitted without regard to the distance between the dial knob and the damper, which are provided to the duct housing, thereby improving the airtightness performance and operation quality of the air vent.

Further, the rotational movement of the dial knob leads to the rotational movement of the damper through the linear movement of the damper connector, which is link-connected to the dial knob. Therefore, the air vent can be stably operated with durability improvement. In addition, the manufacturing and working procedures are simplified, reducing manufacturing costs.

BRIEF DESCRIPTION OF DRAWINGS

The above and other objectives, features and advantages of the present invention will be apparent from the following detailed description of the preferred embodiments of the invention in conjunction with the accompanying drawings, in which:

FIG. 1 is a cross-sectional view illustrating a prior art air vent for a vehicle.

FIG. 2 is an exploded perspective view of an air vent for a vehicle according to the present invention.

FIG. 3 is a perspective view from the bottom surface of the air vent for a vehicle according to the present invention.

FIG. 4 is a partially taken perspective view illustrating the configuration of the air vent for a vehicle according to the present invention.

FIG. 5 is an expanded cross-sectional view illustrating the coupled state of a damper connector according to the present invention.

FIG. 6 is a plane view illustrating the closed state of a damper of the air vent according to the present invention.

FIG. 7 is a plane view illustrating the opened state of the damper of the air vent according to the present invention, and FIG. 8a and FIG. 8b are expanded views for explaining the assembling method of the connectors, the features of the present invention.

BRIEF EXPLANATION OF REFERENCE SIGNS

20: duct housing
21: damper
22: cover fixing boss
23: duct rails
30: dial knob
40: damper rotation member
41: pinion gear
50: knob connector
51: coupling members
60: damper connector
61: rack gear
62: guide hole
63: escape prevention rails
70: guide cover
71: insertion part
72: finishing part

BEST MODE FOR CARRYING OUT THE INVENTION

Hereinafter, reference will be now made to the configuration of the present invention in order to achieve the above objectives with reference to the attached drawings. An air vent for a vehicle, according to the present invention, is to operate a damper for opening or closing the air path of a duct housing by the rotation of a dial knob in association with a gear part, thereby improving operation quality and convenience.

First, an air vent used in the present description, as shown in FIG. 3 to FIG. 5, opens or closes the air path of a duct housing 20 by moving a knob connector 50 and a damper connector 60, which are link-connected to each other, through the rotation of a dial knob 30, which is rotationally coupled to the duct housing 20, so as to rotate a damper rotation member 40 which is coupled to a damper 21.

Explaining the features in detail, the duct housing 20 has the air path provided inside, a vane member is assembled in the front portion of the air path so as to adjust air discharge direction, the damper 21 is rotationally coupled to the rear portion of the air path so as to open or close the air path, and a cover fixing boss 22 is formed in the outside surface of the duct housing.

Further, the dial knob 30 is rotationally coupled to a side surface of the duct housing 20 and has a knob coupling hole 31 formed in the rear portion thereof.

Furthermore, the damper rotation member 40, which is coupled to a damper 21 rotation shaft on the side surface of the duct housing 20, has a pinion gear 41 formed on the outer circumferential surface thereof.

Meanwhile, link connection for transmitting the rotational movement of the dial knob 30 to the damper rotation member 40 is realized by the knob connector 50 and the damper connector 60, wherein the knob connector 50 has coupling members 51 protrudingly formed at both end portions such that the coupling member 51 at one end portion is fitted into the knob coupling hole 31.

In addition, the other end of the knob connector 50 is link-connected to one side end of the damper connector 60, wherein the other side end of the damper connector 60 is provided with a rack gear 61 at an upper portion thereof so as to be engaged with the pinion gear 41 of the damper rotation member 40.

Further, a guide hole 62 is formed in the body part of the damper connector 60 in the back-and-forth longitudinal direction such that the cover fixing boss 22 of the duct housing 20 is positioned in the guide hole 62.

In order to fix the damper connector 60 to move in the back-and-forth direction in a state, in which the rack gear 61 of the damper connector 60 is engaged with the pinion gear 41 on the side surface of the duct housing 20, a guide cover 70 is positioned on the outside of the damper connector 60 so as to be coupled and fixed to the duct housing 20 by a coupling member 73.

As for the shape of the guide cover 70, as shown in FIG. 5, the guide cover 70 has an insertion part 71, into which the cover fixing boss 22 is fitted and of which outer diameter surface comes into contact with the guide hole 62 of the damper connector 60, and a finishing part 72 provided to be stepped on the outside thereof so as to be coupled to the cover fixing boss 22 by the coupling member 73.

Further, duct rails 23 are formed to be protruded on the side surface of the duct housing 20 such that the damper connector 60 is placed on the duct rails so as to smoothly slide along the duct rails, and escape prevention rails 63 are formed on the inside surface of the damper connector 60 so as to be positioned between the dust rails 23, thereby preventing deviation of the damper connector 60 during the sliding movement of the damper connector 60. Therefore, the damper connector 60 linearly moves along the duct rails 23 with safety in the back-and-forth direction.

Herein, a convex protrusion 72a is formed on the finishing part 72 of the guide cover 70 such that a contact area with respect to the outside surface of the damper connector 60 is minimized so as to prevent interference in the sliding movement of the damper connector 60.

According to the present invention structured as above, if the dial knob 30 is rotated in the counterclockwise direction, as shown in FIG. 6, the knob connector 50 connected to the rear portion of the dial knob 30 moves backwards and the damper connector 60, which is link-connected to the knob connector 50, also linearly moves backwards along the duct rails 23 of the duct housing 20 such that the damper rotation member 40 and the damper 21, which are engaged with each other, rotate in association, thereby closing the air path of the duct housing 20.

In order to open the air path, if the dial knob 30 is rotated in the clockwise direction, as shown in FIG. 7, the knob connector 50 connected to the rear portion of the dial knob 30 moves forwards and the damper connector 60, which is link-connected to the knob connector 50, also linearly moves forwards along the duct rails 23 of the duct housing 20 such that the damper rotation member 40 and the damper 21, which are engaged with each other, rotate in association in response to the movement of the damper connector 60, thereby opening the air path of the duct housing 20.

According to the present invention as described hereinabove, it is possible to uniformly and smoothly maintain the operation handling feeling of the dial knob 30 by link-connecting the knob connector 50 and the damper connector 60 without regard to the distance between the dial knob 30 and the damper 21 and rotating the damper 21 engaged with the gear part by the linear movement of the damper connector 60.

Further, FIG. 8a illustrates the coupling features of the dial knob 30 and the knob connector 50, wherein the coupling member 51 is provided corresponding to the knob coupling hole 31 such that the coupling member 51 is fitted into the knob coupling hole 31 by turning.

In addition, FIG. 8b illustrates the coupling features of the knob connector 50 and the damper connector 60, wherein a coupling member 51 in a spherical shape is fitted into the knob coupling hole 31 in a ball-joint manner such that the damper connector 60 can linearly move in a smooth manner in association with the movement of the knob connector 50.

As described above, while the present invention has been particularly shown and described with reference to the example embodiments thereof, it will be understood by a person skilled in the art, to which the present invention belongs, that the above embodiments of the present invention are all exemplified and various changes, modifications and equivalents may be made therein without changing the essential characteristics and scope of the present invention.

The invention claimed is:

1. An air vent for a vehicle, comprising:
    a duct housing (20) having an air path provided inside, a vane member assembled in a front portion of the air path so as to adjust air discharge direction, a damper (21) rotationally coupled to a rear portion of the air path so as to open or close the air path and a cover fixing boss (22) formed in an outside surface;
    a dial knob (30) rotationally coupled to a side surface of the duct housing (20) and having a knob coupling hole (31) formed in a rear portion;
    a damper rotation member (40) coupled to a damper (21) rotation shaft on the side surface of the duct housing (20) and having a pinion gear (41) formed on the outer circumferential surface thereof;
    a knob connector (50) having coupling members (51) protrudingly formed at both end portions such that the coupling member (51) at one end portion is fitted into the knob coupling hole (31);
    a damper connector (60), of which one side end is link-connected to the other end of the knob connector (50) and the other side end is provided with a rack gear (61) at an upper portion thereof so as to be engaged with the pinion gear (41), and having a guide hole (62) formed inside in the back-and-forth longitudinal direction so as to be placed by the cover fixing boss (22) of the duct housing (20); and
    a guide cover (70) having an insertion part (71), into which the cover fixing boss (22) is fitted and of which outer diameter surface comes into contact with the guide hole (62) of the damper connector (60), and a finishing part (72) provided to be stepped on the outside thereof so as to be coupled to the cover fixing boss (22) by a coupling member (73).

2. The air vent for a vehicle according to claim 1, wherein duct rails (23) are formed to be protruded on the side surface of the duct housing (20) so as to be placed by the inside surface of the damper connector (60) and escape prevention rails (63) are formed on the inside surface of the damper connector (60) so as to be positioned between the dust rails (23), such that the damper connector (60) linearly moves along the duct rails (23) in the back-and-forth direction.

3. The air vent for a vehicle according to claim 1, wherein a convex protrusion (72a) is further formed on the finishing part (72) of the guide cover (70), which comes into contact with the outer surface of the damper connector (60), such that the damper connector (60) and the convex protrusion (72a) come into contact with each other.

* * * * *